United States Patent

George

[15] 3,643,873
[45] Feb. 22, 1972

[54] PROCESS FOR FRAGMENTING SCRAP METAL

[72] Inventor: Robert George, Liege, Belgium
[73] Assignee: George & Cie S.P.R.L., Liege, Belgium
[22] Filed: May 27, 1969
[21] Appl. No.: 828,283

[30] Foreign Application Priority Data

July 25, 1968 Belgium...................................41957

[52] U.S. Cl......................................241/3, 100/92, 100/95, 100/249, 241/15
[51] Int. Cl........................................................B02c 19/12
[58] Field of Search....................241/3, 15, 62, DIG. 22, 13; 100/92, 95, 249

[56] References Cited

UNITED STATES PATENTS 3,137,101  6/1964  Leliaert......................................51/13
3,298,138  1/1967  McCormick, Jr............................51/13

FOREIGN PATENTS OR APPLICATIONS 950,245  1/1964  Great Britain...................241/DIG. 22

Primary Examiner—Othell M. Simpson
Attorney—Robert E. Burns and Emmanuel J. Lobato

[57] ABSTRACT

A process for fragmenting scrap metal comprises precompressing the scrap metal into blocks having numerous interstices therein, flowing liquid nitrogen at a temperature between −0° and −120° C. through the interstices to cool and embrittle the blocks, and then compressing the cooled and embrittled blocks to fragment them into pieces of scrap metal. If desired, the fragmented scrap metal may then be seperated according to its size or composition. The process is particularly suitable for fragmenting automobile wrecks and if the scrap separated contains iron and iron alloys, the separating step may be magnetically performed.

5 Claims, 1 Drawing Figure

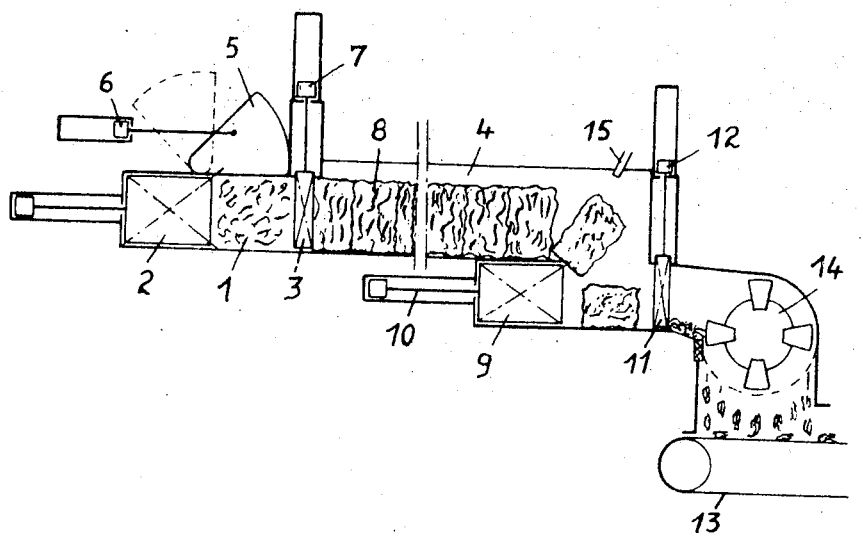

PROCESS FOR FRAGMENTING SCRAP METAL

This invention relates to the treatment of metallic scrap.

The problems encountered during the recovery of scrap material of all types such as automobile wrecks, outmoded household and industrial apparatus and other industrial byproducts are known. Aside from the economic interest of such a discovery, it is mandatory to systematically eliminate such refuse and since the quantities thereof are ever growing, economical and practical solutions must be sought.

The heterogeneous makeup of most of these wastes constitutes a first source of difficulty since their treatment by fusing of the whole gives products which cannot satisfactorily be used.

The manual sorting methods obviously give scrap which is quite homogeneous, but has proven much too expensive owing to the amount of labor necessary, especially since the work is extremely slow.

The sizes, and consequently the volume of the scrap to be treated is often considerable and this is another source of difficulty due both to the impossibility of "resmelting" the material in its actual state and because of the costs of transport to treatment sites.

One solution has been the use of equipment allowing compression, of, for example, an automobile into a compact block. This method which is still of widespread use facilitates the transport of compress scrap to the foundry. However on one hand the equipment necessary is extremely costly and on the other hand, as already indicated, the melting of the blocks obtained gives an overall heterogeneous product which cannot receive an optimal use, in particular because of the too high copper and other materials content, the subsequent elimination of which is difficult. This method must therefore be given up.

Another technique consists of fragmenting in an enormous crusher the scrap material and then to classify by kind, the nonferrous materials, being for example separated from the ferrous materials by a magnetic process. The drawbacks of this method consists essentially in the high cost of the crushers and the considerable amount of energy absorbed thereby, crushers of this kind having power requirements on the order of 2,000 to 3,000 volts and more. Additionally, the size of the installations require that they be located in a place which is not compatible with the cheap conveying of the material to be treated.

The present invention proposes a new method allowing the inexpensive fragmentation of scrap, the sorting by type taking place later and according to known methods.

It is based on the fact that metals become pliable when they are brought to sufficiently low temperatures, iron and its alloys being more sensitive to such lowering of temperature than other metals normally present in scrap.

It has been noted that when the temperature is lowered to around $-75°$ C., iron and its normal alloys become so fragile and brittle that they can be broken by the simple application of a compression force while other metals still remain ductile.

The process of the invention provides the cooling of precompressed scrap metal to temperatures lower than $-75°$ C., for example between $-80°$ and $-120°$ C., and then subjecting them to a mechanical compression treatment and/or beating and then to a magnetic separation.

According to the invention, this cooling takes place advantageously by contacting the scrap metal with liquid or gaseous nitrogen. The still cold nitrogen which has served to bring the scrap metals to the required fragmenting temperature will then be recovered for a new liquidizing or preferably will be used for the precooling of the scrap metal.

Before cooling, the scrap metal is subjected to a stage of first incomplete compression or precompression whereby numerous interstices remain in the packages or blocks and which comprised flowpaths for allowing therethrough the ready passage of the cooling gas, and for contributing towards the latter operation of stronger compression or beating. This processing of the scrap metal is indispensable for the inexpensive transport at the site of the treatment. These passages will advantageously be of substantially constant dimensions in order to facilitate the treatment operations. The latter takes place in a cooling tower made of any suitable material, for example of stainless steel, and whose cross section is slightly greater than that of the packages in order to ensure intimate contact between the nitrogen and the scrap metal.

The accompanying drawing shows schematically by way of a non-limiting example one embodiment of apparatus for carrying out the process of the invention.

The scrap metal to be treated is introduced in a precompression chamber 1, wherein it is initially compressed between the head of a hydraulic press and a support surface comprising part of the retractable door 3 of the cooling tunnel 4. Chamber 1 is closed near the top during the pressing operation by means of a washing cover 5 operated by a hydraulic piston 6. Door 4 is also operated by a hydraulic piston 7. The scrap metal is brought by compression to the shape of packages 8 which have a practically constant transverse cross section and a thickness which can vary somewhat according to their initial shape. After pressing, door 3 is raised and press 2 pushes the formed packages into tunnel 4, the effect of which is to cause the assembly of packages 8 to progress one after the other into the tunnel, the first package thus falling at the end of the tunnel in front of the head of a second hydraulic press 9 actuated by a piston 10 which is operable to effect fragmentation of the scrap packages which are applied against a stop surface, for example the surface of a retractable exit door 11 of the tunnel, which is also controlled by hydraulic piston 12. After fragmentation, the door 11 is raised and the press pushes the fragmented scraps outside a tunnel. The scrap is evacuated towards the sorting station, for example by means of a conveyor belt 13, optionally after passage into a rotary cross-separator 14. Liquid nitrogen is injected into the tunnel towards its outlet by means of pipe 15 or other known device.

The process of the invention, may include a multiple number of treatment by stages for cooling and breaking the scrap material which avoids transportation expenses. Additionally, the consumption of liquid nitrogen is very moderate being of the order of 0.4 liters of nitrogen per kilo of scrap metal or an expense of about 0.5 Belgian francs.

As a matter of fact, it is known that nitrogen has a specific heat of 0.24 cal./kg. and a heat evaporation of 6 cal./kg. while the specific heat of iron is 0.111 cal./kg.

If it is assumed that nitrogen is injected into the tunnel at $-195°$ C. and that it comes out of the tunnel at $-10°$ C., it will have liberated: $6+0.24\times185=50.4$ calories per kg.

Moreover, the iron will be, for example, cooled from plus $20°$ to $-90°$ C. by absorbing: 110 times $0.11=12.1$ cal. per kg. 1 kg. of nitrogen therefore allows treatment of $50.4/12.1=4.16$ kg. of iron, this being understood at an efficiency of 100 percent. In practice, experiments have shown that the efficiency is of the order of magnitude of 75 percent, under these conditions 1 kg. of nitrogen cools $4.16\times0.75=3.12$ kg. of iron.

The treatment of 1 kg. of iron require therefore $1/3.12=0.32$ kg. of nitrogen or since when 1 liter of nitrogen weighs 0.812 kg. a consumption of 0.394 liters of nitrogen.

The above calculation is an approximation and does not take into account the nitrogen used for cooling other metals and wastes contained in the mass to be treated. However, the iron being by far the main constituent of the scrap under consideration, the amount to be added to the above numbers is not very considerable.

What is claimed is:

1. A process for fragmenting scrap metal comprising: providing a quantity of scrap metal to be fragmented; precompressing the scrap metal into blocks having numerous interstices therein defining flow passages, flowing liquid nitrogen at a temperature between $-60°$ C. and $-120°$ C. through said flow passages to sufficiently cool the blocks and render them brittle enough to fragment upon further compression; and further compressing the cooled blocks to fragment same into pieces of scrap metal.

2. A process according to claim 1; wherein said providing step comprises providing a quantity of scrap metal composed mainly of iron and iron alloys.

3. A process according to claim 2; including magnetically separating the iron and iron alloy fragments from the fragmented scrap metal.

4. A process according to claim 1; wherein said flowing step comprises flowing liquid nitrogen at a temperature between −80° C. and −100° C. through said flow passages.

5. A process according to claim 1; including separating the fragmented scrap metal according to its composition.

* * * * *